(12) United States Patent
Flesch et al.

(10) Patent No.: US 11,981,971 B2
(45) Date of Patent: May 14, 2024

(54) METHOD AND APPARATUS FOR COOLING A TOOL

(71) Applicant: GEDIA GEBRÜDER DINGERKUS GMBH, Attendorn (DE)

(72) Inventors: Volker Flesch, Attendorn (DE); Bjoern Mueller, Attendorn (DE); Patrick Mueller, Kirchhundem (DE); Maik Winderlich, Drolshagen (DE); Thorsten Wisnia, Attendorn (DE)

(73) Assignee: GEDIA GEBRUEDER DINGERKUS GMBH, Attendorn (DE)

( * ) Notice: Subject to any disclaimer, the term of this patent is extended or adjusted under 35 U.S.C. 154(b) by 586 days.

(21) Appl. No.: 17/275,220

(22) PCT Filed: Sep. 24, 2019

(86) PCT No.: PCT/DE2019/100834
§ 371 (c)(1),
(2) Date: Apr. 4, 2021

(87) PCT Pub. No.: WO2020/074038
PCT Pub. Date: Apr. 16, 2020

(65) Prior Publication Data
US 2022/0042138 A1 Feb. 10, 2022

(30) Foreign Application Priority Data
Oct. 9, 2018 (DE) .......................... 102018124909.8

(51) Int. Cl.
*C21D 11/00* (2006.01)
*G05D 7/00* (2006.01)
(Continued)

(52) U.S. Cl.
CPC .............. *C21D 11/005* (2013.01); *G05D 7/00* (2013.01); *G05D 7/0664* (2013.01); *G05D 16/00* (2013.01);
(Continued)

(58) Field of Classification Search
CPC . C21D 11/005; F27D 2009/0013; F27D 9/00; G05D 7/00; G05D 7/0664;
(Continued)

(56) References Cited

U.S. PATENT DOCUMENTS 3,995,687 A 12/1976 Euler
4,250,840 A * 2/1981 Kudinov .................. C21B 7/10
122/406.1

(Continued)

FOREIGN PATENT DOCUMENTS

CN 105783527 A 7/2016
DE 277738 B 12/1988

*Primary Examiner* — Jessee R Roe
*Assistant Examiner* — Michael Aboagye
(74) *Attorney, Agent, or Firm* — Andrew Wilford

(57) ABSTRACT

The invention relates to a method for cooling a tool in a heat treatment furnace, wherein: the tool is supplied during normal cooling operation with coolant from a coolant reservoir through a supply inlet (1), which coolant is returned into the coolant reservoir from the tool via a return flow (2); the supply inlet (1) is coupled by means of an electric actuator (3) alternatively to the coolant reservoir or to the public water supply and the return flow (2) is coupled by means of a further electric actuator (3) alternatively to the coolant reservoir or to the public waste water system (4); the actuators (3, 3') are supplied with a feed current during normal cooling operation and held in a first position in which coolant is supplied to the tool through the supply inlet (5) from the coolant reservoir and the coolant is fed back through the return flow (2, 6) into the coolant reservoir; and, upon interruption in the power supply, the actuators (3, 3')

(Continued)

are forced into an emergency position in which cold water is supplied to the tool through the supply inlet (7) from the public water supply and the water is discharged through the return flow (2, 8) into the public waste water system (4).

5 Claims, 1 Drawing Sheet

(51) Int. Cl.
  *G05D 7/06* (2006.01)
  *G05D 16/00* (2006.01)
  *G05D 16/20* (2006.01)
  *G05D 23/00* (2006.01)
  *G05D 23/19* (2006.01)
(52) U.S. Cl.
  CPC ........... *G05D 16/206* (2013.01); *G05D 23/00* (2013.01); *G05D 23/19* (2013.01)
(58) Field of Classification Search
  CPC ........ G05D 16/00; G05D 23/00; G05D 23/19; G05D 16/206
  USPC ......... 266/241, 46, 113, 83, 87, 89, 99, 190; 373/165, 76
  See application file for complete search history.

(56) References Cited

U.S. PATENT DOCUMENTS

| | | | |
|---|---|---|---|
| 4,301,320 A | | 11/1981 | Hochstrasser |
| 4,911,107 A | * | 3/1990 | Crispin ................. F22D 11/003 122/1 R |
| 6,793,874 B2 | * | 9/2004 | Ly ........................... C21B 7/103 122/1 R |

* cited by examiner

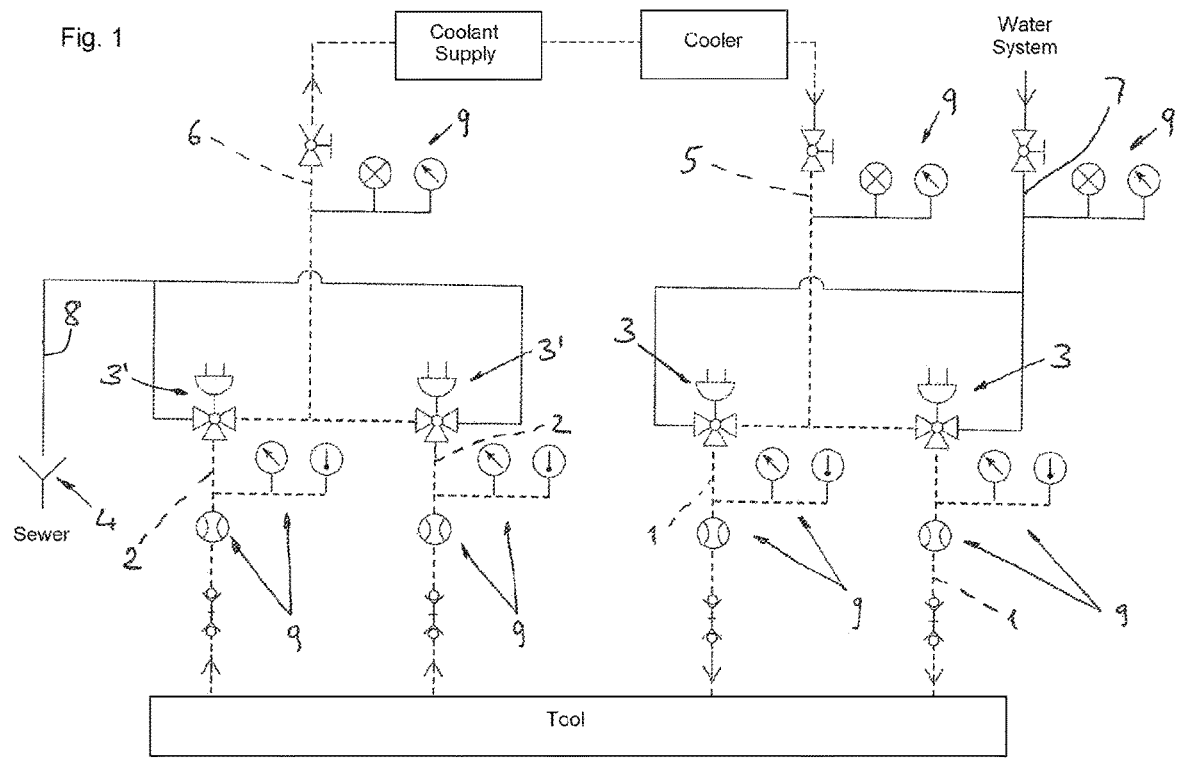
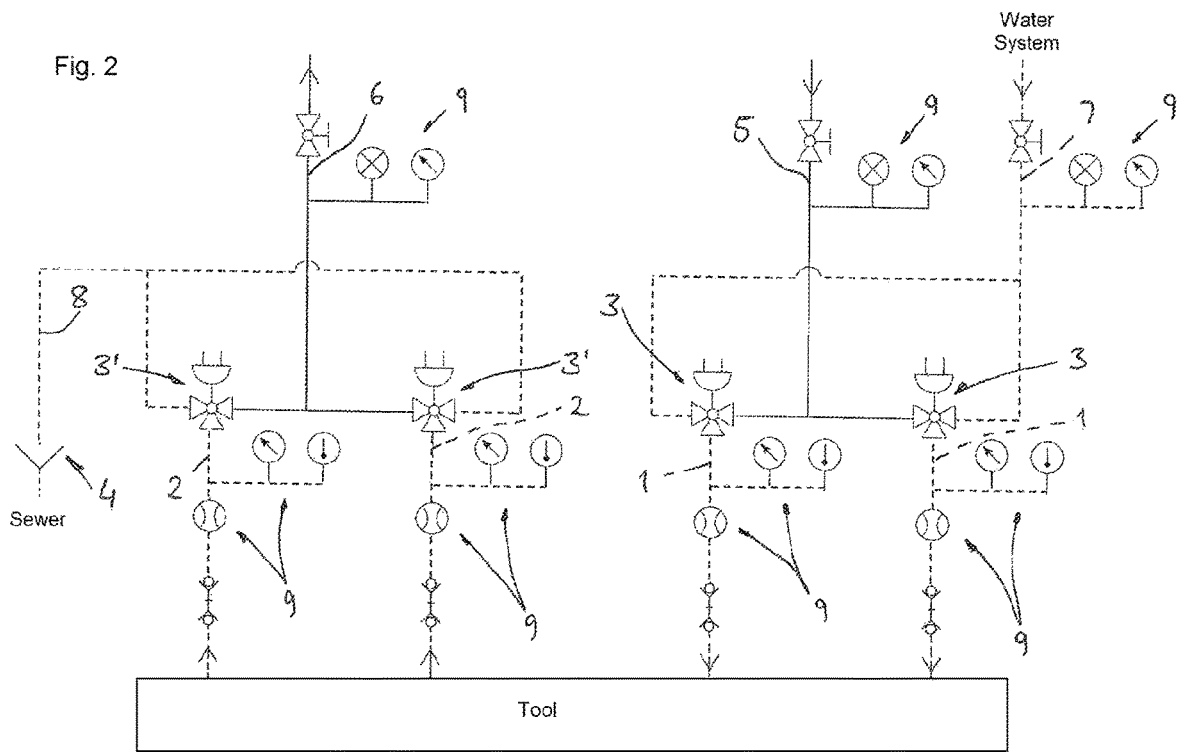

METHOD AND APPARATUS FOR COOLING A TOOL

CROSS REFERENCE TO RELATED APPLICATIONS

This application is the US-national stage of PCT application PCT/DE2019/100834 filed 24 Sep. 2019 and claiming the priority of German patent application 102018124909.8 itself filed 9 Oct. 2018.

FIELD OF THE INVENTION

The invention relates to a method of cooling a tool in a heat-treatment furnace, with the tool during a normal cooling operation having a feed receiving from a coolant supply coolant that then flows through the tool to a return thereon and thence back to the coolant supply.

BACKGROUND OF THE INVENTION

Such methods for cooling a tool and an apparatus for carrying out the cooling processes are known in the prior art. The tool is connected to a cooling circuit that draws coolant from a coolant supply through a feed and introduces it into the tool. The coolant heated in the tool is then sent back via a return to the coolant supply that itself is cooled so that the coolant can be recirculated.

The disadvantage of such a cooling process is that, in the event of a power failure, the tool cannot be cooled because the coolant cannot be pumped form the coolant supply into the tool. The heat-treatment furnace does not work in the event of a power failure since no further energy is added, but a high temperature remains in the furnace, and the uncooled tool in it is subject to thermal damage.

OBJECT OF THE INVENTION

The object of the invention is therefore to provide a method and an apparatus in which and with which a tool is cooled in a heat-treatment furnace even in the event of an interruption of the power supply.

SUMMARY OF THE INVENTION

To attain this object the invention proposes that the feed is connectable by an electrical control valve either with the coolant supply or to a municipal water system and the return is connectable by a further electric control valve either with the coolant supply or to a municipal sewage system, and control valves are supplied during normal cooling operation with electricity and held thereby in a first position in which coolant is fed via an output line of the coolant supply to the tool and therefrom the coolant is fed via the return back to the coolant supply and, on interruption of electric supply, the control valves automatically assume an emergency position in which cold water is fed from the municipal water system to the tool, then through the tool, and thence via the return to a drain of the municipal sewage system.

The control valve is supplied with a feed current and is held by this current in a first position. In this position the process is a normal cooling operation in which the tool receives coolant via the feed from the coolant supply and the coolant flows via the return from the tool back into the coolant supply. The coolant is moved by an electrical pump through the tool.

In the event of an interruption in the power supply, for example in the event of a power failure, the pump cannot move any coolant to the tool. The power supply to the control valves is also interrupted and the control valves are urged automatically into an emergency position in which the tool is supplied from the municipal water system with cold water. The municipal water is fed into the tool by the standard line pressure. This means that the tool is also cooled in the event of an interruption of its power supply.

It is preferably provided that parameters of the coolant are recorded during coolant inflow and outflow and, in the event of the actual recorded parameters falling below or going above predetermined set-point parameters of the coolant, the control valves are forced into the emergency position.

The recorded parameters are compared with previously defined parameters. If these set-point parameters are exceeded or not reached, the power is automatically cut off and the control valves are automatically moved into the emergency position in which the tool is supplied with municipal cold water. This is not just on a power failure, but also when falling below or going over critical limit values.

It is preferably provided that the parameters of sensors are recorded, with temperature, pressure and the flow rate of the coolant being measured.

These parameters are particularly suitable for protecting the tool from overheating.

It is preferably provided that the control valves with a are biased with a spring force into the emergency position and the opposite position of the control valves is effected by supplying power that overcomes the spring force and moves the control valves into the first position.

The spring biasing has the advantage that the emergency position in the event of an interruption in the power supply is assumed without action form outside. This at all times ensures that the tool is sufficiently cooled.

In a regular cooling operation, the coolant moves into and out of the tool connected to the normal cooling circuit through a control valve and the tool is cooled by the coolant drawn from the coolant supply. The coolant is pumped into the tool by means of an electric pump.

The control valves are powered with electricity and thereby held in a first position in which the coolant of the coolant supply flows through the apparatus and the tool is cooled by the coolant.

If the power supply is interrupted, no more coolant can be pumped into the tool and the cooling operation shifts from operation as a normal cooling circuit to an emergency cooling circuit. The power supply to the control valves is also interrupted so that the control valves are forced into an emergency position and inflow from the municipal water system and connection to the drain of the municipal sewage system is effected. The municipal water gets to the tool, so that the apparatus is then traversed by cold water and the tool is cooled by this cold water. This ensures at all times that the tool is sufficiently cooled and protected from damage in the event of an interruption in the power supply, such as a power failure.

The control valves are forced into the emergency position by interrupting the power supply, so that an automatic changeover takes place without the need for external actions.

It is preferably provided that the feed, the return, and the intake and output lines of the coolant supply are each provided with sensors for recording parameters of the coolant and, if the detected parameter is higher or lower than predetermined parameter levels of the coolant, the power supply is shut down.

The parameters of the coolant such as temperature, pressure and flow rate are recorded. These parameters are compared with defined parameters and falling below or going above the parameter levels effects shutdown of the power supply. The control valves powered by the power supply that are held in the first position in which the tool is supplied with the coolant of the coolant supply are reset by the interruption of the power supply forcibly into the emergency position so that the tool is then controlled by tap water.

It is preferably provided that the control valves each have a spring that biases them into the emergency position and the first position is returned to once the power is restored, since the electricity will overcome the spring force.

During normal regular operation of the apparatus, the control valves are supplied with the feed current and held in the first position in which the tool is cooled by the coolant of the coolant supply. The applied power counters a spring force that urges the control valves into the emergency position when the power supply is interrupted. If the control valves are then supplied with power, it overcomes the spring force holding the control valves in the emergency position, so that an automatic changeover from emergency cooling takes place. This means that if there is an interruption of the power supply, no external intervention on the control valves is necessary and the tool is sufficiently cooled at all times.

BRIEF DESCRIPTION OF THE DRAWING

An embodiment of the apparatus according to the invention is shown in shown in the drawing and explained in more detail below. In the drawing:

FIG. 1 is a schematic view of the apparatus during normal cooling;

FIG. 2 is a schematic view of the apparatus during emergency cooling.

SPECIFIC DESCRIPTION OF THE INVENTION

The figures show schematically an apparatus for cooling a tool in a heat-treatment furnace and for carrying out a method of cooling the workpiece.

The apparatus has two feeds 1 and two returns 2 that are connected to a tool not shown in the figures. The feeds and returns 1 and 2 are connected to electrical control valves 3 and 3' that can connect them as a normal cooling circuit (FIG. 1) or an emergency-cooling circuit (FIG. 2). During normal cooling operation (FIG. 1) the control valve 3 and 3' are powered electrically and thus held in a first position in which the feed and return are connected as a normal cooling circuit and the coolant flows through the tool. This normal circuit is shown in FIG. 1 in broken lines. In it the feed 1 is connected with an output line 5 of the coolant supply and the return is connected with an intake line 6 of the coolant supply not shown in the drawing. The coolant is circulated through the coolant supply and the tool by an electrical pump.

On interruption of the power supply, the electrical pump no longer moves coolant through the apparatus and the control valves 3 and 3' are forced into an emergency position in which the feed and return 1 and 2 are connected as an emergency cooling circuit (FIG. 2) and the tool is traversed by of water under pressure from the municipal water system. The emergency cooling circuit is shown in dashed lines. The return 2 is connected via a drain line 8 to a municipal sewage system 4 so that the heated municipal water is returned to the municipal water cycle.

By operating the control valves 3 and 3' automatically when the power supply is interrupted, the tool is sufficiently cooled and protected from damage. The control valves 3 and 3' are forced into the adjusted emergency position, so that automatic changeover takes place without doing anything to the apparatus from outside such as, for example, a manual changeover.

The feeds and returns 1 and 2 of the tool are provided with sensors 9 that record parameters of the coolant such as temperature, pressure and flow rate. The intake and output lines 5 and 6 of the coolant supply also have sensors 9 that detect such parameters. The readings are compared with predetermined parameters. When falling below or exceeding the predetermined parameter levels, power is cut and the apparatus is switched to the emergency cooling circuit and the control valves 3 and 3' are automatically moved by interruption of the power into the emergency position so that the tool is cooled by water from the public supply.

The control valves 3 and 3' each have a spring that moves them in the event of an interruption in the power supply forcibly into the emergency position. If there is no power interruption, the control valves are supplied with current and the spring force that moves the control valves 3 and 3' when the power supply is interrupted forcibly into the emergency position, is overcome, so that the control valves 3 and 3' are held in the first position.

The forced resetting of the control valves 3 and 3' to the emergency cooling circuit takes place automatically. No external intervention is necessary in the event of an interruption in the power to the control valves 3 and 3', and the tool continuously cooled.

The process sequence is shown below with reference to the figures.

During normal cooling operation, which is shown in FIG. 1 by the dashed lines, the tool is supplied via its feed 1 with coolant from the coolant supply that flows through the tool. The heated coolant then flows from the return 2 of the tool back into the coolant supply, which is equipped with a cooler, and in which the heated coolant is cooled for re-use. The feed and return 1 and 2 are connected to the intake and output lines 5 and 6 of the coolant supply.

During inflow and outflow, parameters of the coolant, such as temperature, pressure and flow rate, are recorded and compared with set-point parameters.

The feeds 1 are each connected by an electric control valve 3 and 3' alternatively to the coolant supply or to the municipal water system. The returns 2 are each connected by one further electrical control valve 3 and 3' alternatively to the coolant supply or to the municipal sewage system 4. During normal operation, the control valves 3 and 3' are supplied with electricity and held thereby in the first position and the tool receives coolant from the output line 5 of the coolant supply and this coolant moves back through the return 2 of the tool and the intake line 6 of the coolant supply into the coolant supply (FIG. 1).

In the event of an interruption in the power supply, such as a power failure, power to the control valves 3 and 3' is interrupted and the control valves 3 and 3' are forcibly reset to the emergency position, in which the tool receives water from the municipal water system. This emergency cooling circuit is shown in dashed lines in FIG. 2. The water flows through the tool and moves via the return 2 and the drain 8 to the municipal sewage system 4. Thus a cooling of the tool is also possible on interruption of the power supply.

In addition, the power is interrupted if a comparison shows that an actual parameter of the coolant is above or below a predetermined set-point range for parameter of the coolant. In this case too, the control valves 3 and 3' are forcibly reset into the emergency position and the tool is cooled with cold water from the municipal water system (FIG. 2). Comparing the parameters and resetting the control valves 3 and 3' to the emergency position protects tool from overheating and thus from damage.

Thus, the tool is cooled both during a power failure as well as when a critical parameter of the cold water is exceeded or undershot.

The control valves 3 and 3' each have a resetting spring that urges them continuously with a spring force into the emergency position. The alternative (first) position of the control valves 3 and 3' is set by the power supply that overcomes the spring force and holds the control valves 3 and 3' in the first position. This means that the control valves 3 and 3' are moved into the emergency position without any outside action and that the tool is sufficiently cooled at all times.

The invention is not restricted to the illustrated embodiment, but variable within the framework of the disclosure.

The invention claimed is:

1. A method of cooling a tool in a heat-treatment furnace, the method comprising the step of:
providing an electrical control valve for connecting a feed of the tool either to an output line of a coolant supply or to a municipal water system;
providing another electrical control valve for connecting a return of the tool either with an intake line of the coolant supply or to a municipal sewage system;
during normal cooling operation setting the control valves with electricity into and holding them electrically in a first position in which coolant is fed from the output line of the coolant supply to the tool and from the tool via the return back to the coolant supply;
on interruption of electric supply to the control valves, automatically returning the control valves into an emergency position in which cold water is fed from the municipal water supply to the tool, then through the tool, and thence via the return to a drain of the municipal sewage system;
monitoring actual parameters of the coolant during normal operation; and, if the actual parameters are higher or lower than predetermined set-point parameters, automatically moving the control valves into the emergency position.

2. The method according to claim 1, wherein the parameters are recorded by sensors that detect temperature, pressure and flow rate of the coolant.

3. A method of cooling a tool in a heat-treatment furnace, the method comprising the step of:
providing an electrical control valve for connecting a feed of the tool either to an output line of a coolant supply or to a municipal water system;
providing another electrical control valve for connecting a return of the tool either with an intake line of the coolant supply or to a municipal sewage system;
during normal cooling operation setting the control valves with electricity into and holding them electrically in a first position in which coolant is fed from the output line of the coolant supply to the tool and from the tool via the return back to the coolant supply;
on interruption of electric supply to the control valves, automatically returning the control valves into an emergency position in which cold water is fed from the municipal water supply to the tool, then through the tool, and thence via the return to a drain of the municipal sewage system;
biasing the control valves by a spring force into the emergency position; and
setting the valves in the first position by supplying electrical power to the valves to counteract the spring force and thereby move the control valves into the first position.

4. An apparatus for cooling a tool in a heat-treatment furnace, the apparatus comprising:
a coolant supply having an intake line and an output line;
a coolant feed and a coolant return connected to the tool;
control valves connected to the coolant feed and to the coolant return as a normal cooling circuit and an alternate emergency cooling circuit, the control valves
during a normal cooling operation connecting the coolant feed and the coolant return as the normal cooling circuit in a first position in which a coolant flows through the tool, the feed is connected via the intake line to the coolant supply and the return back to the coolant supply, and the control valves
in an emergency position during a power failure reset and connect the feed and return of the tool as the emergency cooling circuit in which water is fed through the tool by connection of the feed with a tap of a municipal water system and the return is connected to a municipal sewage system;
respective sensors on the feed, the return, the coolant intake line, and the coolant outlet line the detect parameters of the coolant therein;
means for interrupting electrical power supply when actual detected values of the parameters either exceed or fall below predetermined desired levels of the parameters.

5. An apparatus for cooling a tool in a heat-treatment furnace, the apparatus comprising:
a coolant supply having an intake line and an output line;
a coolant feed and a coolant return connected to the tool;
control valves connected to the coolant feed and to the coolant return as a normal cooling circuit and an alternate emergency cooling circuit, the control valves
during a normal cooling operation connecting the coolant feed and the coolant return as the normal cooling circuit in a first position in which a coolant flows through the tool, the feed is connected via the intake line to the coolant supply and the return back to the coolant supply, and the control valves
in an emergency position during a power failure reset and connect the feed and return of the tool as the emergency cooling circuit in which water is fed through the tool by connection of the feed with a tap of a municipal water system and the return is connected to a municipal sewage system;
a respective spring in each of the control valves that urges the control valves forcibly into the emergency position; and
a power supply electrically urging the valves into the first position with a force that overcomes a spring force of the springs.

* * * * *